United States Patent [19]

Chen

[11] Patent Number: 5,544,379
[45] Date of Patent: *Aug. 13, 1996

[54] MULTIFUNCTIONAL QUICK RELEASE FOR A BICYCLE

[75] Inventor: Chao-Hu Chen, Taichung Hsien, Taiwan

[73] Assignee: Kalloy Industrial Co., Ltd., Taichung Hsien, Taiwan

[*] Notice: The term of this patent shall not extend beyond the expiration date of Pat. No. 5,409,321.

[21] Appl. No.: 277,001

[22] Filed: Jul. 19, 1994

[51] Int. Cl.⁶ .................................................. B25F 1/00
[52] U.S. Cl. ............................... 7/138; 7/165; 280/281.1
[58] Field of Search ............................... 7/138, 165, 169, 7/178; 280/278, 281.1, 287; 403/321, 322, 330

[56] References Cited

U.S. PATENT DOCUMENTS

| | | | |
|---|---|---|---|
| D. 53,352 | 5/1919 | Brace | 7/169 X |
| 2,804,970 | 9/1957 | Kuc et al. | |
| 4,175,298 | 11/1979 | Muller et al. | 7/138 |
| 5,099,726 | 3/1992 | Hsiao | |
| 5,320,004 | 6/1994 | Hsiao | |
| 5,357,643 | 10/1994 | Seals | 7/138 |
| 5,409,321 | 4/1995 | Chen | 403/321 |

FOREIGN PATENT DOCUMENTS 955400  1/1957  Germany.

Primary Examiner—James G. Smith
Attorney, Agent, or Firm—Morton J. Rosenberg; David I. Klein

[57] ABSTRACT

A quick release for a bicycle includes a handle portion which has two ears extending from one end thereof such that a space is defined between the two ears, a pin pivotally engaged between the two ears of the handle portion, a bolt having a first end fixed to the pin between the two ears of the handle portion and a second threaded end, a nut threadedly engaged with the second end of the bolt, a gasket mounted around the bolt and movably abutting against the two ears of the handle portion, the improvement comprising: the bolt having an extension portion which extends from the second threaded end thereof and is hexagonal in section; the pin having a first end and a second end which are hexagonal in section and respectively extend outwards of the two ears of the handle portion; and the handle portion having a plurality of hexagonal slots defined in a mediate portion thereof and having a plurality of rectangular openings defined in a peripheral portion thereof.

3 Claims, 5 Drawing Sheets

5,544,379

MULTIFUNCTIONAL QUICK RELEASE FOR A BICYCLE

BACKGROUND OF THE INVENTION

1. Field of Invention

The present invention relates to a quick release for a bicycle, and more particularly to a quick release with multifunctions.

2. Related Prior Art

The closest prior art of a quick release for a bicycle is disclosed in the Applicant's own copending patent application, U.S. Ser. No. 08/104,765, filed Aug. 12, 1993. However, such a quick release is not able to perform the function of a wrench and is not easy to be assembled and dismantled.

The present invention has arisen to mitigate and/or obviate the above-mentioned disadvantages of the conventional quick release for a bicycle.

SUMMARY OF THE INVENTION

The primary objective of the present invention is to provide a quick release for a bicycle.

Another objective is to provide a quick release which is able to carry out a function of the wrench so as to serve as a tool for assembling and dismantling the parts of the bicycle without the need for an additional tool box to be attached thereto.

A further objective is to provide a quick release which does not take up much space and is easy to be assembled and dismantled.

In accordance with one aspect of the present invention, there is provided a quick release comprising a handle portion which has two ears extending from one end thereof such that a space is defined between the two ears, a pin pivotally engaged in the space between the two ears of the handle portion, a bolt having a first end fixed to the pin between the two ears of the handle portion and a second threaded end, a nut threadedly engaged with the second end of the bolt, a gasket mounted around the bolt and movably abutting against the two ears of the handle portion, the improvement comprising: the bolt having an extension portion extending outwardly from the second threaded end thereof and disposed outside the nut, the extension portion of the bolt being hexagonal in section; the pin having a first end and a second end respectively extending outwards of the two ears of the handle portion, the first and second ends of the pin being hexagonal in section; and the handle portion having a plurality of hexagonal slots defined in a mediate portion thereof and having a plurality of rectangular openings defined in a peripheral portion thereof.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
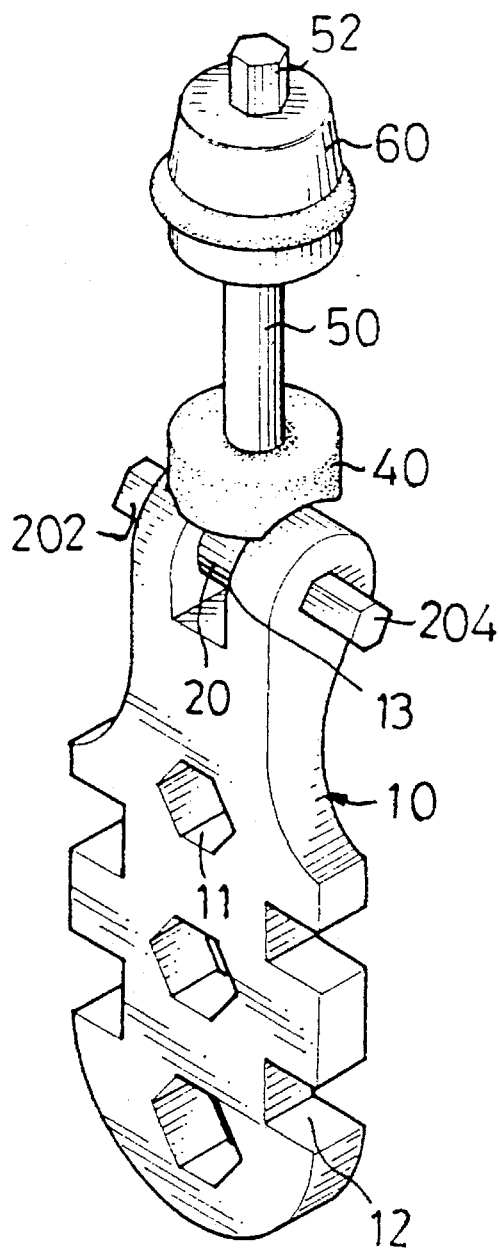
FIG. 1 is a perspective view of a quick release in accordance with the present invention.
Figure 2:
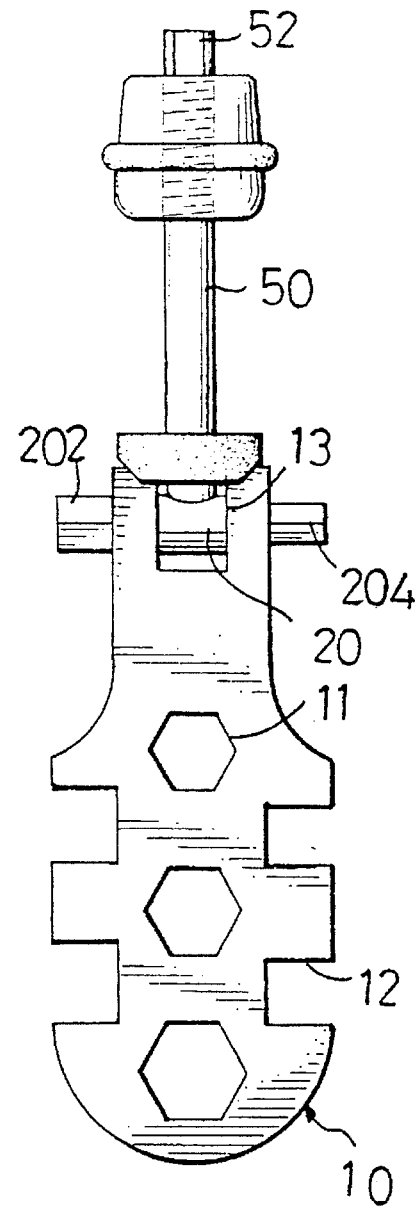
FIG. 2 is a front plan view of the quick release as shown in FIG. 1.
Figure 3:
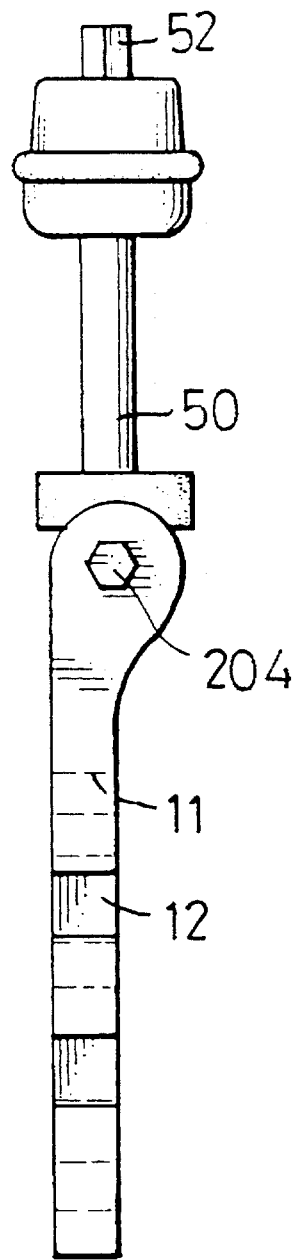
FIG. 3 is a side view of the quick release as shown in FIG. 1.

Referring to the drawings, and initially to FIGS. 1–3, a quick release for a bicycle comprises a handle portion 10 which has two ears (not labeled) extending from one end thereof such that a space 13 is defined between the two ears, a pin 20 pivotally engaged in the space 13 between the two ears of the handle portion 10, a bolt 50 having a first end fixed to the pin 20 between the two ears of the handle portion 10 and a second threaded end, a nut 60 threadedly engaged with the second end of the bolt 50, a washer 40 mounted around the bolt 50 and movably abutting against the two ears of the handle portion 10. The above-mentioned structure and operation are conventional and thus are not further described here.

Preferably, the improvement of the present invention is that the bolt 50 has an extension portion 52 extending outwardly from the second threaded end thereof and disposed outside the nut 60, the extension portion 52 being hexagonal in section, the pin 20 has a first end 202 and a second end 204 respectively extending outwards of the two ears of the handle portion 10, the first and second ends 202 and 204 of the pin 20 being hexagonal in section, and the handle portion 10 has a plurality of hexagonal slots 11 defined in a mediate portion thereof and has a plurality of rectangular openings 12 defined in a peripheral portion thereof. In addition, each of the plurality of hexagonal slots 11 in the handle portion 10 has a different dimension with each other and each of the plurality of rectangular openings 12 in the peripheral portion of the handle portion 10 has a different dimension with each other.

Figure 4:
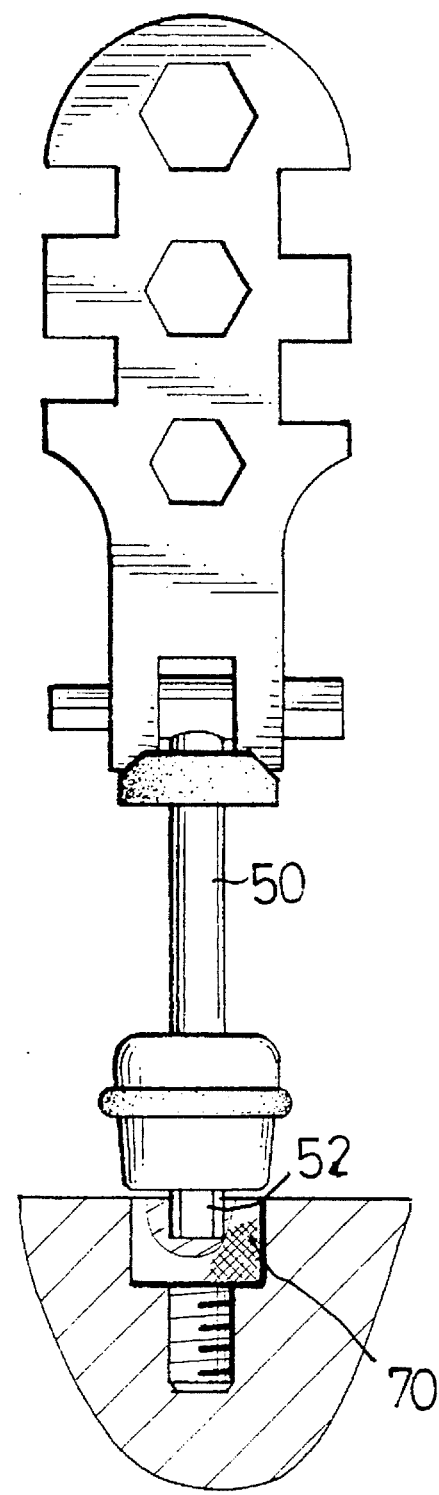
FIGS. 4–7 are different operation modes of the quick release as shown in FIG. 1.
Figure 5:
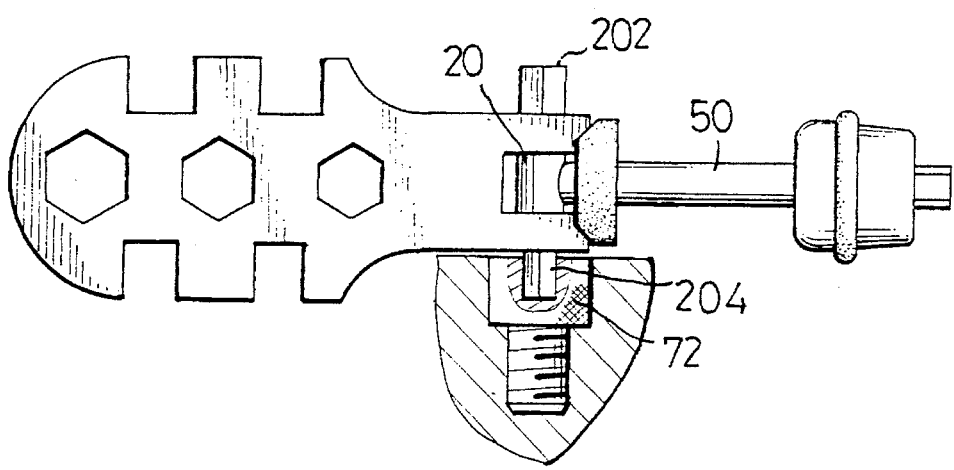

Referring to FIGS. 4 and 5, the extension portion 52 of the bolt 50 and the first and second ends 202 and 204 of the pin 20 have a different size with each other such that they are available to operate with sockets of different sizes. For example, the extension portion 52 of the bolt 50 and the second end 204 of the pin 20 are respectively fitted in the bolts 70 and 72 with hexagonal sockets of different sizes.

Figure 6:
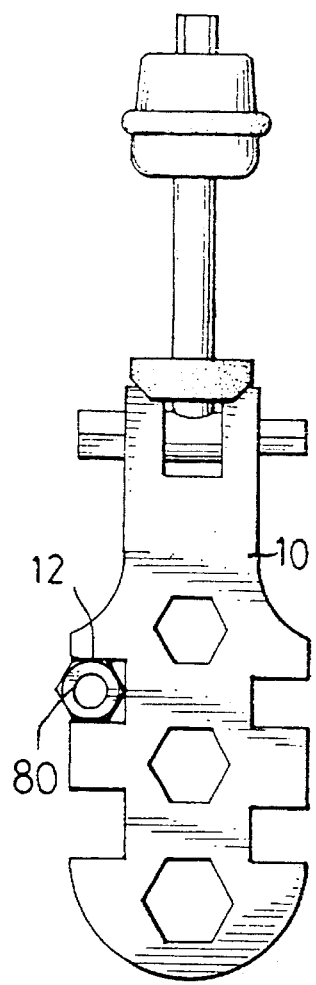
Figure 7:
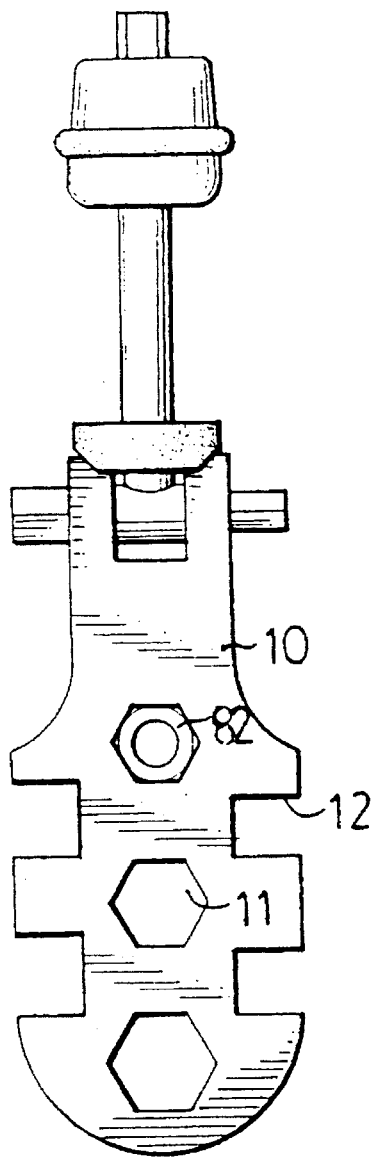

Referring to FIGS. 6 and 7, the rectangular openings 12 and the hexagonal slots 11 are suitable for hexagonal nuts 80 and 82 of different sizes.

Figure 8:
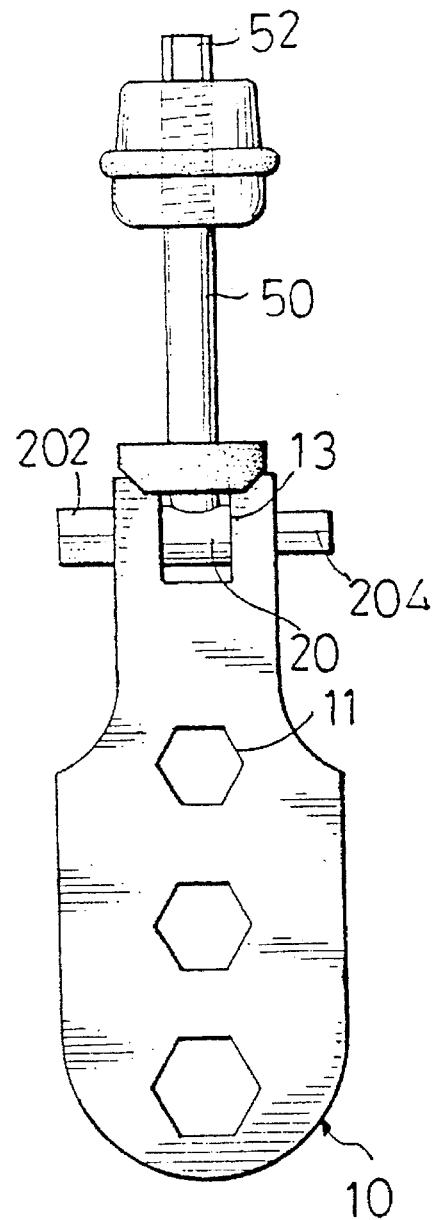
FIGS. 8–10 are different shapes of the handle portion of the quick release.
Figure 9:
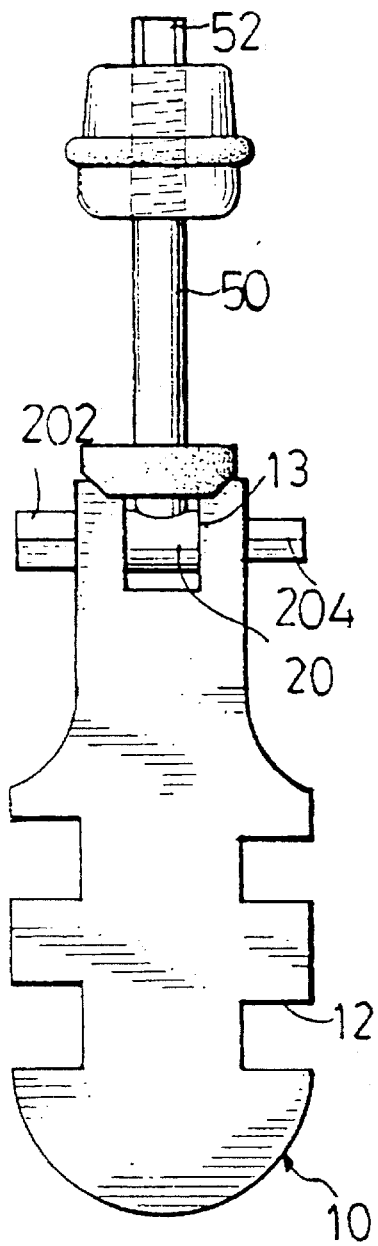
Figure 10:
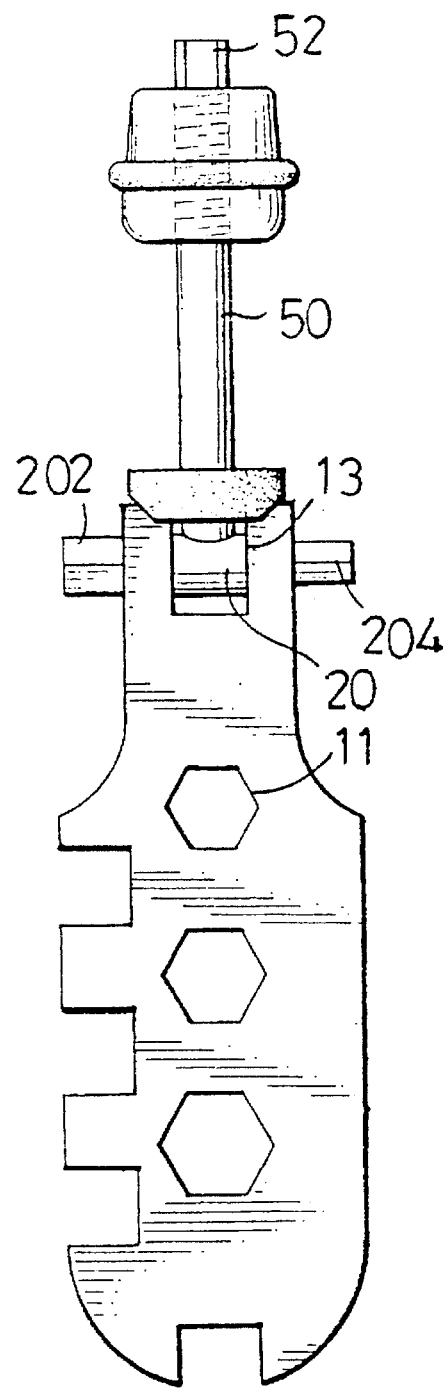

Referring to FIGS. 8–10, the hexagonal slots 11 and the rectangular openings 12 have different mounting manners in the handle portion 10. In FIG. 8, the rectangular openings 12 are not defined. In FIG. 9, the hexagonal slots 11 are not defined. In FIG. 10, parts of the rectangular openings 12 are removed.

Accordingly, by such an arrangement, a quick release in accordance with the present invention has the following advantages and benefits:

(1) The quick release is the necessary part of the bicycle and is able to carry out a function of the wrench so as to serve as a tool for assembling and dismantling the parts of the bicycle without the need for an additional tool box to be attached thereto.

(2) The quick release does not take up much space and is easy to be assembled and dismantled, so facilitating fixing of the bicycle and effectively increasing the operating efficiency.

It should be clear to those skilled in the art that further embodiments of the present invention may be made without departing from the teachings of the present invention.

I claim:

1. A quick release for a bicycle comprising a handle portion (10) which has two ears extending from one end thereof such that a space (13) is defined between said two ears, a pin (20) pivotally engaged in said space (13) between said two ears of said handle portion (10), a bolt (50) having a first end fixed to said pin (20) between said two ears of said handle portion (10) and a second threaded end, a nut (60) threadedly engaged with the second end of said bolt (50), a washer (40) mounted around said bolt (50) and movably abutting against said two ears of said handle portion (10), the improvement comprising:

said bolt (50) having an extension portion (52) extending from said second threaded end thereof and disposed outside said nut (60), said extension portion (52) being hexagonal in section;

said pin (20) having a first end (202) and a second end (204) respectively extending outwards of said two ears of said handle portion (10), said first and second ends (202) and (204) being hexagonal in section; and said handle portion (10) having a plurality of hexagonal slots (11) defined in a mediate portion thereof and having a plurality of rectangular openings (12) defined in a peripheral portion thereof.

2. The quick release in accordance with claim 1, wherein said plurality of hexagonal slots (11) in said handle portion (10) have a different dimension with each other.

3. The quick release in accordance with claim 1, wherein said plurality of rectangular openings (12) in said handle portion (10) have a different dimension with each other.

* * * * *